Dec. 11, 1962   T. F. TRIBE   3,068,346
SPOT-WELDING MACHINES

Filed Sept. 6, 1960   5 Sheets-Sheet 1

Inventor:
Thomas Francis Tribe
By Kenyon, Palmer & Stewart
Attorneys

United States Patent Office 3,068,346
Patented Dec. 11, 1962

3,068,346
SPOT-WELDING MACHINES
Thomas Francis Tribe, Dudley, Worcester, England, assignor of one-half to British Federal Welder and Machine Company Limited
Filed Sept. 6, 1960, Ser. No. 54,317
Claims priority, application Great Britain Sept. 3, 1959
9 Claims. (Cl. 219—80)

This invention concerns electric-resistance, spot-welding machines which are required for a row of close-pitched weld spots e.g. for uniting a pair of panels to form a structure such as a vehicle door, a trunk lid or the floor of a vehicle.

When the pitch of the weld spots is relatively small, for instance 1 inch, difficulty is experienced in bringing the electrode holders sufficiently close together and if they are brought close together with a relatively long row of weld spots the number of electrodes can be so great that the current demand of the welding machine becomes excessive.

It is an object of the present invention to reduce or eliminate the disadvantages referred to while enabling a large number of weld spots to be made.

According to this invention the head of a spot-welding machine which comprises an electrode holder, a reciprocating slide carrying the holder, means for reciprocating the slide, a device for holding the slide against movement at a plurality of spaced positions each of which corresponds with a weld spot and switch means actuated by the holding device for controlling the welding current to the electrode so that welding is performed by the electrode only while the slide is stationary at one of said positions is characterised in that a plurality of electrodes are carried by a common reciprocating slide the electrodes being spaced apart in the direction of movement of the slide the arrangement being that all the electrodes perform a weld at the same time to produce a row of welds when the slide completes its stroke.

While commonly the row of weld spots is in a straight line and therefore the slide is moved along a straight line it may be that the row of weld spots are on a curved line in which event the slide has an arcuate movement. For convenience the reference in the specification and claims to a reciprocating movement is to be understood as including a straight line movement and a curved movement.

It is a preferred feature of the present invention that the switch means referred to is also actuated by the reciprocating slide so that when the slide completes its stroke the welding current is automatically cut off.

Figure 1:
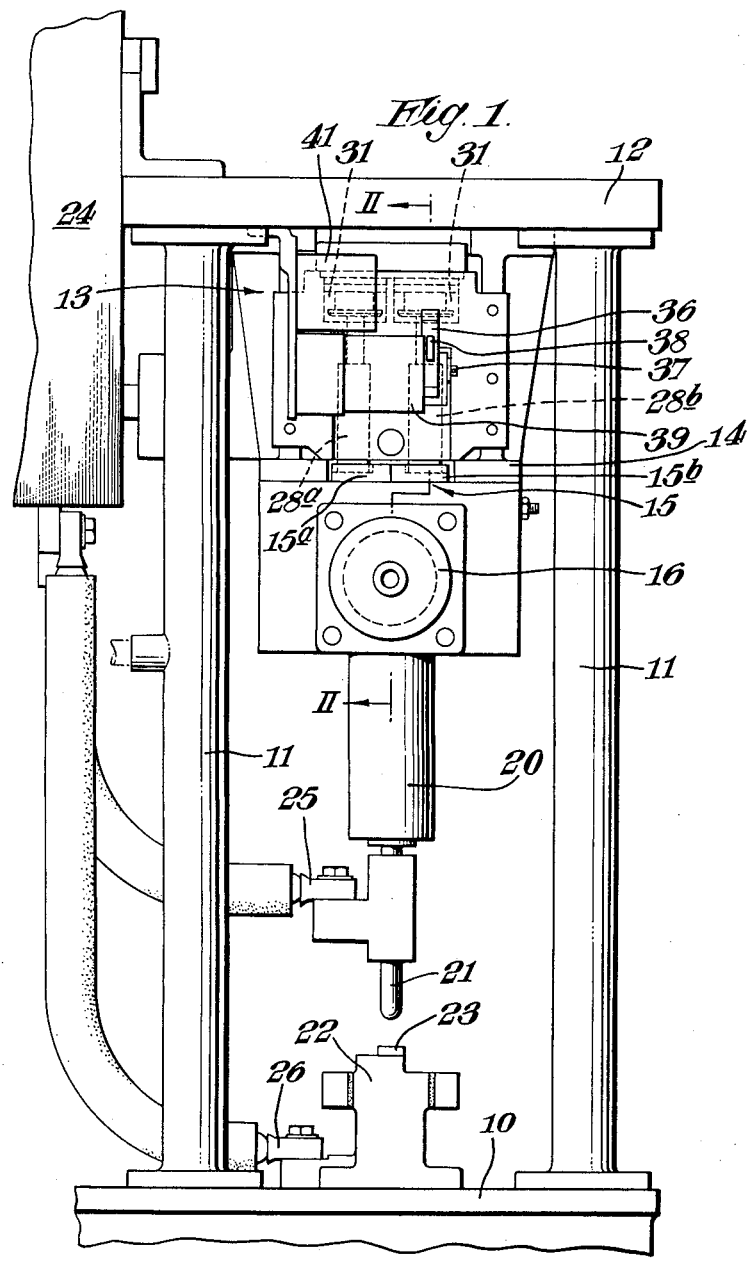
Figure 2:
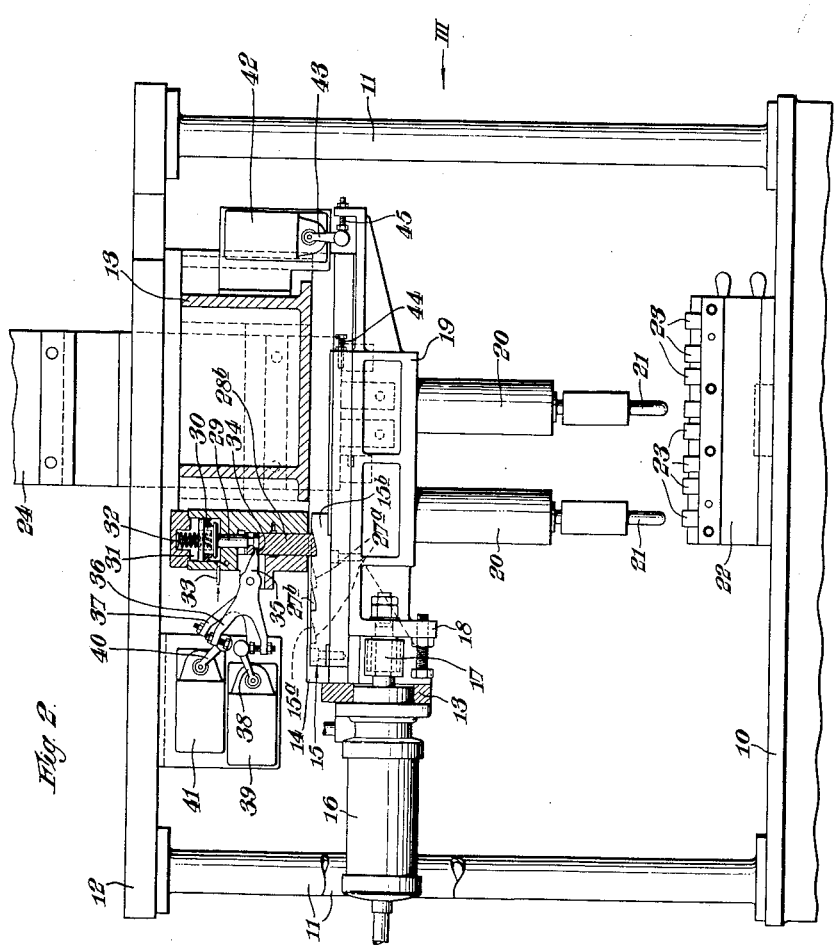
Figure 3:
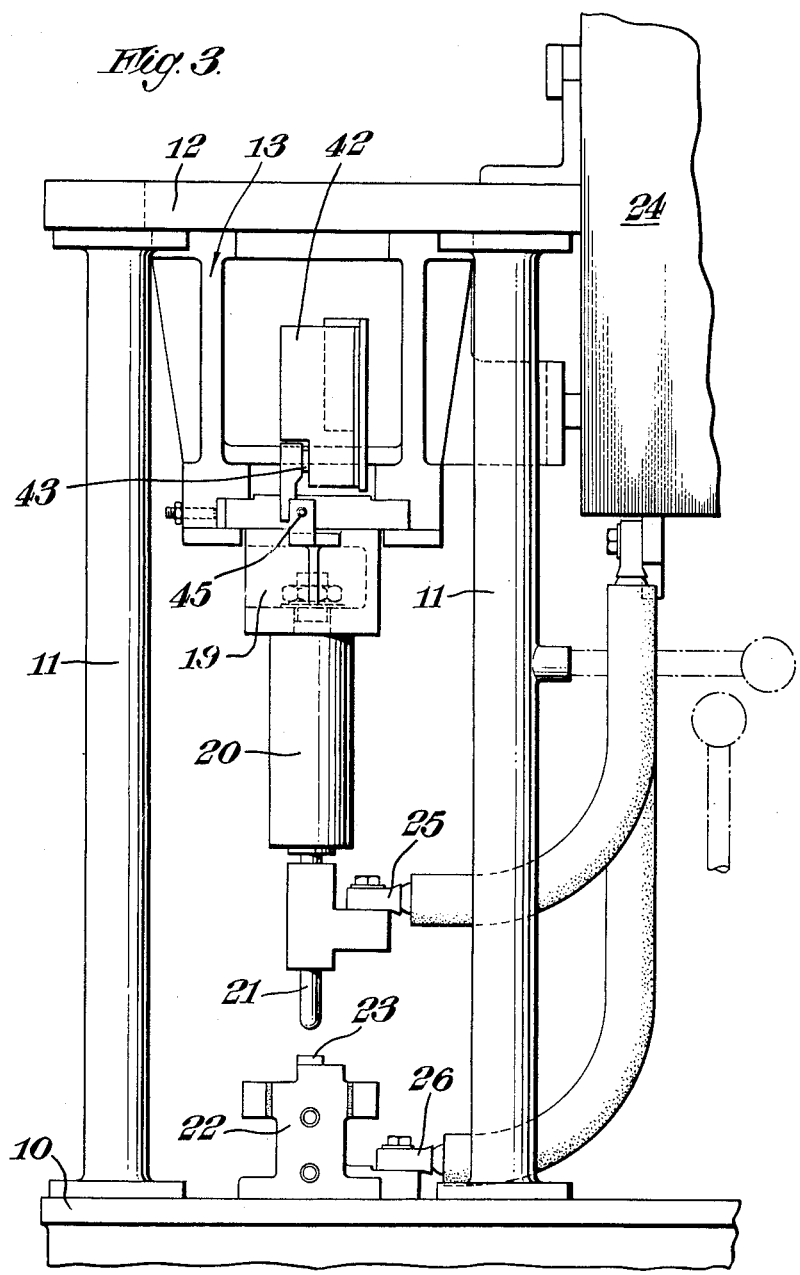
Figure 4:
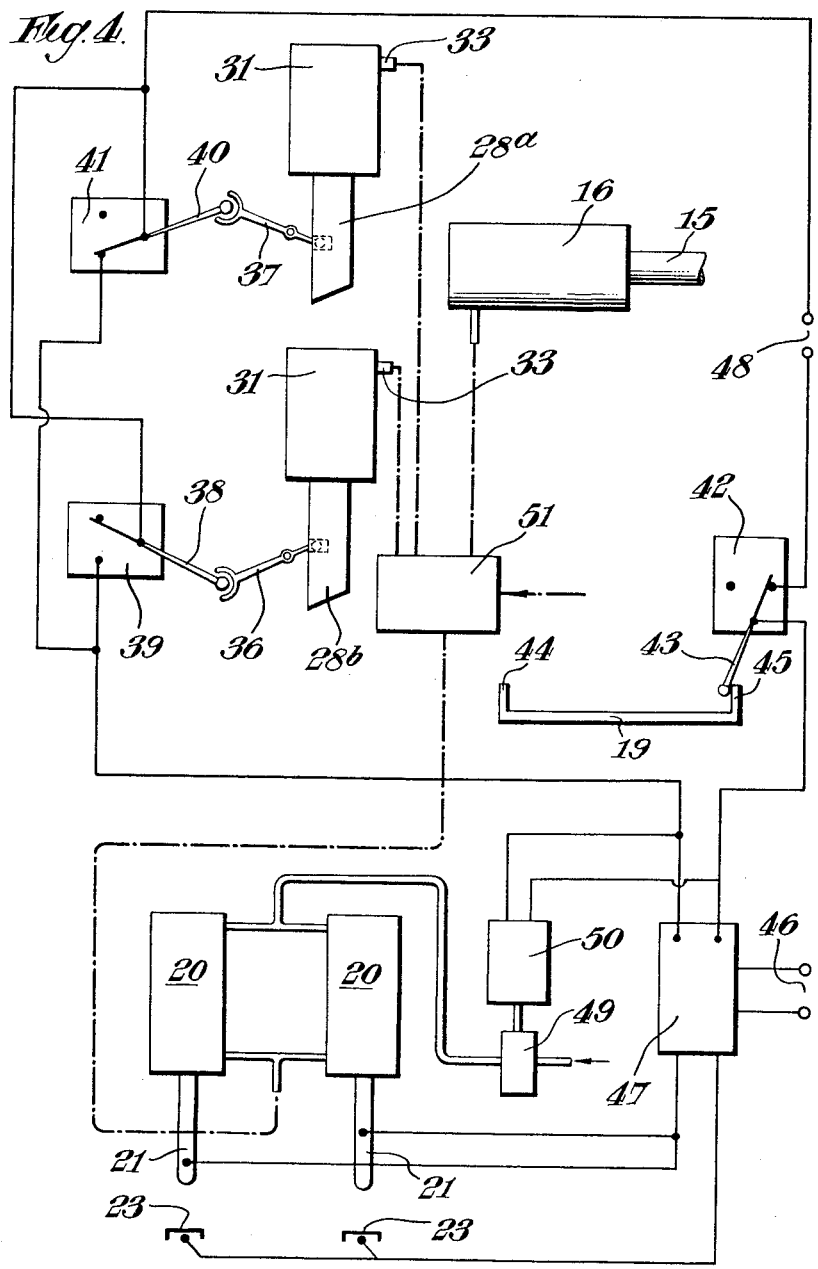
Figure 5:
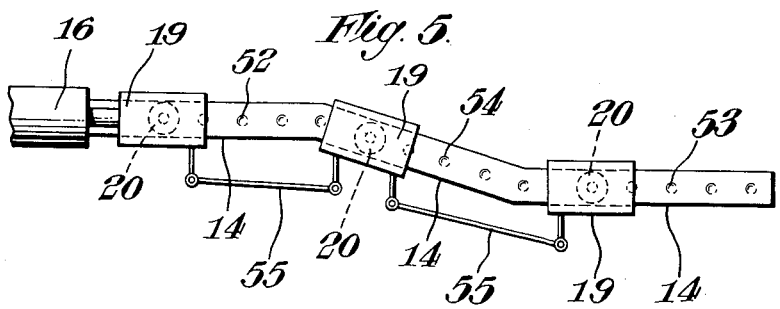
Figure 6:
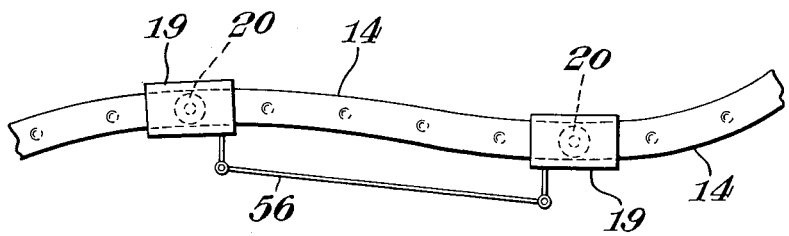

A welding machine in accordance with the present invention will now be described with reference to the accompanying drawings whereof:

FIG. 1 is a end view of the machine,
FIG. 2 is a side view partly in section on the line II—II of FIG. 1,
FIG. 3 is a view in the direction of the arrow III of FIG. 2,
FIG. 4 is a schematic view of a control system for the machine of FIG. 1 and
FIGS. 5 and 6 are diagramatic views of alternative constructions of machine according to this invention.

Referring to FIGS. 1, 2 and 3: the machine comprises a base 10, pillars 11 and a head piece 12 supported by the pillars.

A sub-frame 13 is suspended from the head piece 12 and carries a guide way 14 for a reciprocating slide 15. The sub-frame 13 also supports a pneumatic cylinder 16 the piston rod 17 of which is connected to a cross-head 18 secured to the slide 15. The cross-head 18 is coupled to a block 19 from which a pair of electrode holders 20 depend. The electrode holders 20 carry electrodes 21 in known manner.

A table 22 is secured to the base 10 and supports a row of studs or buttons 23 with which the electrodes 21 co-act to form a weld spot in known manner it being understood that the electrodes 21 and the studs 23 are connected to a transformer 24 by cables 25, 26 respectively. The electrode holders 20 are supplied with pressure fluid so that the electrodes 21 are lowered to engage a pair of panels resting on the studs 23 to perform the spot welding operation in usual manner.

The reciprocating slide 15 is in two parts, 15a and 15b which lie side by side and are coupled to the cross head 18 for common actuation. The upper surface of the slide 15b is formed with ratchet teeth 27b and similarly the slide 15a is formed with ratchet teeth 27a and it is arranged, as shown in FIG. 2, that the teeth of the two slides overlap and are spaced apart by half the pitch of the ratchet teeth.

The sub-frame 13 also carries a pair of reciprocating pawls 28a and 28b, the pawl 28a engaging the teeth 27a and the pawl 28b engaging the teeth 27b. Each pawl is coupled by a rod 29 with a piston 30 lying within a cylinder 31 and there is a spring 32 urging the piston 30 and the associated pawl downwardly into engagement with the ratchet teeth. A duct 33 supplies compressed air to the cylinder 31 thereby to raise the piston 30 against the action of spring 32 so that the associated pawl disengages the ratchet teeth.

Pawl 28b (FIG. 2) is recessed to receive a head 34 of a limb 35 of a Y-lever 36 which is pivoted to subframe 13 at 37. Similarly the pawl 28 is connected with a Y-lever 37, the levers 36, 37 lying side by side.

A switch arm 38 for switch 39 is received between the limbs of the lever 36 the arrangement being that when the pawl 28b is fully lowered into engagement with the ratchet teeth the lever 36 sets arm 38 so that switch 39 in closed. When pawl 28b is raised switch arm 38 is adjusted by lever 36 to open the switch 39. Similarly the lever 37 adjust the switch arm 40 of the switch 41.

Because of the disposition of the ratchet teeth 27a, 27b as mentioned above while, for instance, pawl 28b fully engages one of the teeth 27b, as shown in FIG. 2, pawl 28a will be in engagement with the crest of a tooth 27a, both pawls being urged downwardly by their springs 32. Conversely when pawl 28a is in full engagement with a tooth 27a pawl 28b will engage the crest of a tooth 27b. In the first position referred to switch 39 will be closed and switch 41 will be open while in the second position referred to switch 41 will be closed and switch 39 will be open.

The distance between the electrodes 21 is such that the first and the fifth studs 23 lie beneath the electrodes in the starting position shown in FIG. 2. Also the pair of ratchet teeth 27a and the pair of teeth 27b being offset by half of the pitch of the teeth in combination with a pawl 28a, 28b, for each ratchet slide is the equivalent of a pawl and ratchet having four teeth. It is arranged that the spacing between the teeth is equivalent to the spacing between the studs of the two sets of studs 23, each set of which comprises four studs.

The mechanism so far described operates as follows:
With pawl 28b (FIG. 2) in engagement with a tooth 27b switch 39 is closed. Switch 39 forms part of a control system which ensures that while a pawl is in full engagement with one of the ratchet teeth welding current can pass to the electrodes 21. The welding machine is brought into operation in usual manner whereby the electrodes 21 are lowered to perform the welding operation and welding current can pass to the electrodes since switch 39 has set the control system to allow this. On completion of the welding operation the electrodes 21 are retracted. Compressed air enters from duct 33 to the cylinder 31 of pawl 28b—compressed air is not delivered to the cylinder 31 of pawl 28a—with the result that the pawl 28b is raised to disengage the tooth 27b. Thereafter compressed air is delivered to the cylinder 16 so that the slide 15 is moved towards the right in FIG. 2.

Pawl 28a is urged downwardly by its spring 32 so that as the slide 15 moves across the pawl 28a is brought into full engagement with a tooth 27a. At the same time the electrodes 21 are moved with the slide 15 and when the tooth 27a is fully engaged by the pawl 28a the electrodes are immediately above the second and the sixth studs 23 counting from the left in FIG. 2. When pawl 28a is in full engagement with the tooth 27a pawl 28b rests on the crest of a tooth 27b and is urged downwardly by spring 32 on to the crest of the tooth, compressed air having been exhausted from the associated cylinder 31. When pawl 28b is raised switch 39 is opened. When pawl 28a is in full engagement with a tooth 27a lever 37 will have adjusted the switch arm 40 to close the switch 41. With switch 41 closed the control system is set to ensure that welding current can pass to the electrodes 21. The electrode holders 21 are automatically brought into operation and the second welding operation is performed. Thereafter the cycle of operations is repeated.

Two welds are simultaneously performed and at the end of each welding operation the electrode holders are advanced so that they are immediately above the next pair of studs 23 whereupon the next welding operation is performed. The switches 39, 41 ensure, however, that welding can only take place while the electrodes 21 are properly positioned immediately above the studs 23.

In the particular arrangement being described eight welds are made in a row utilising only two electrodes which are advanced step by step so that a pair of welds are produced in four successive positions. It will be evident that the conventional arrangement of providing an electrode for each weld would be extremely difficult or impossible where, as is evident for the spacing of the studs 23 in FIG. 2, the welds are close-pitched.

When the row of eight spot-welds has been completed the cylinder 16 is actuated to retract the slide 15 to its starting position as shown in FIG. 2.

The sub-frame 13 carries a switch 42 having an arm 43 which depends from the switch so that it is engageable by studs 44, 45 mounted on the electrode carrier 19. When the slide 15 is fully retracted by cylinder 16 to its starting position the stud 45 will have engaged the switch arm 43 to close the switch 42. When the last pair of welds have been formed the slide 15 is moved to its fully advanced position in which the stud 44 sets the switch arm 43 to open the switch 42. The switch 42 controls the supply of welding current in similar manner to the switches 39, 41 and it is arranged that during retraction of the slide 15 by the cylinder 16 welding current cannot be supplied to the electrodes 21 irrespective as to actuation of switches 39, 41 with rising and falling movement of the pawls 28a, 28b while the rack slides 15a, 15b are moved across beneath the bolts.

Referring now to FIG. 4: the supply of welding current from source 46 to the electrodes 21 is regulated by a device diagrammatically illustrated at 47. Switches 39, 41 and 42 are in a circuit comprising a source of supply 48 and are connected to the device 47 so that welding current is supplied to the electrodes 21 in the particular conditions specified above. Pressure fluid to the electrode holders 20 to lower the electrodes 21 is regulated by a valve 49 which is electrically controlled by a device 50. The device 50 is actuated conjointly with the device 47. Finally, reference numeral 51 diagrammatically indicates a sequence valve which is automatically controlled in accordance with the welding cycle to supply pressure fluid to the cylinders 16, 31 and to the electrode holders 20 so that the cycle of operations detailed above is automatically performed.

The arrangement described with reference to FIGS. 1, 2 and 3 is provided to form a row of welds extending in a straight line. In FIG. 5 there is diagrammatically illustrated a modification wherein two parallel spaced rows of weld-spots 52, 53 extend end to end with a straight, oblique row 54 of weld-spots between them. For each row 52, 53, 54 there is provided a guide-way 14 extending in an appropriate direction and there is an electrode holder mounted for reciprocating movement along each guide-way. The cylinder 16 moves the electrode holder for the row 52 and the electrode holders are interconnected as diagrammatically illustrated at 55, so that the three electrode holders are simultaneously moved along in appropriate direction, one of the electrode holders being associated with a pawl and ratchet mechanism as described above.

In yet another alternative construction diagrammatically illustrated in FIG. 6 a pair of electrode holders 20 are inter-connected, as diagrammatically shown at 56, so that they move along curved paths arranged end to end in shallow S-outline, the guide-ways 14 being of corresponding formation.

A machine according to this invention may be used to make a line of welds of which all the welds are the same distance apart or in which same or all of the welds are spaced apart by different distances.

What I claim is:

1. The head of an electric-resistance, spot-welding machine comprising at least a pair of electrode holders, spaced apart a multiple of the distance between the weld spots to be made a common reciprocating slide carrying the holders, means for reciprocating the slide, a device for holding the slide against movement at a plurality of spaced welding positions and switch means actuated by the holding device for controlling the welding current to the electrodes so that welding is performed by the electrodes only while the reciprocating slide is stationary at one of said spaced positions.

2. A head for a spot-welding machine as claimed in claim 1 wherein switch means is provided which is actuated by the reciprocating slide, said switch means controlling the welding current so that welding is performed only while the slide is reciprocating in one direction.

3. A head for a spot-welding machine as claimed in claim 1 in which the holding device comprises a pawl and ratchet whereof the rising and falling movement of the pawl controls said switch means.

4. A head for a spot-welding machine as claimed in claim 3 wherein a pair of pawl and ratchet mechanisms are provided which are alternatively operative to hold the slide against reciprocating movement and wherein for each pawl there is provided a switch means the arrangement being that when either of the pawls is in holding position with respect to its ratchet said switch means permits welding current to pass to the electrodes.

5. A head for a spot-welding machine as claimed in claim 4 wherein both pawls are spring urged to engage their ratchets and each pawl is moved pneumatically to disengage its ratchet.

6. A head for a spot-welding machine as claimed in claim 2 wherein at each of its extremes of travel the reciprocating slide actuates a switch the arrangement being that when the welding operations have been completed said switch is actuated to prevent passage of welding current to the electrodes.

7. A head for a spot-welding machine as claimed in claim 1 wherein two or more reciprocating slides are provided for movement each along a straight line of which the directions of travel are obliquely inclined to one another, the slides being coupled together for common actuation.

8. A head for a spot-welding machine as claimed in claim 1 in which the reciprocating slide is arranged for arcuate movement.

9. A head for a spot-welding machine as claimed in claim 8 wherein two or more slides are provided each for movement along an arcuate path of different curvature and wherein the slides are coulped together for common actuation.

References Cited in the file of this patent

UNITED STATES PATENTS

| | | |
|---|---|---|
| 853,241 | Helberger | May 14, 1907 |
| 1,074,383 | Rietzel | Sept. 30, 1913 |
| 2,234,232 | Chambers | Mar. 11, 1941 |